United States Patent [19]

Barbiero

[11] Patent Number: 5,022,677
[45] Date of Patent: Jun. 11, 1991

[54] MOTOR VEHICLE SEAT FEATURING TWO SEAT BELTS

[75] Inventor: Roberto Barbiero, Formegine, Italy

[73] Assignee: Ferrari S.P.A. Esercizio Fabbriche Automobile E, Modena, Italy

[21] Appl. No.: 454,965

[22] Filed: Dec. 22, 1989

[30] Foreign Application Priority Data

Dec. 23, 1988 [IT] Italy .................. 53642 B/88

[51] Int. Cl.$^5$ .................................. B60R 22/06
[52] U.S. Cl. ........................... 280/801; 280/804; 297/473; 297/483; 297/485
[58] Field of Search ............... 280/801, 802, 804, 806, 280/808; 297/468, 473, 483, 485, 487

[56] References Cited

U.S. PATENT DOCUMENTS

| 3,897,082 | 7/1975 | Takado et al. | 280/150 |
| 4,317,583 | 3/1982 | Pilhall | 280/804 |
| 4,363,501 | 12/1982 | Takada | 280/804 |
| 4,585,251 | 4/1986 | Yoshitsugu | 280/804 |
| 4,817,754 | 4/1989 | Muramoto | 280/808 |
| 4,909,539 | 3/1990 | Morner | 280/801 |

FOREIGN PATENT DOCUMENTS

| 3537089 | 10/1945 | Fed. Rep. of Germany . |
| 2409943 | 3/1974 | Fed. Rep. of Germany . |
| 2531227 | 12/1975 | Fed. Rep. of Germany . |
| 2929108 | 7/1979 | Fed. Rep. of Germany . |
| 2226302 | 4/1974 | France . |
| 2182839 | 11/1985 | United Kingdom . |

Primary Examiner—Richard A. Bertsch
Attorney, Agent, or Firm—Shlesinger Arkwright & Garvey

[57] ABSTRACT

A seat comprising a first eyelet secured to the top of the seatback, on one side of the same, and inside which a first belt slides; a winding device for the first belt, secured to the rear surface of the seat; a carriage traveling substantially longitudinally and to which is secured one end of the first belt; a second eyelet secured to the seat portion of the seat and inside which a second belt slides; a second winding device secured underneath the seat for winding the second belt; and means for retaining one end of the second belt, which means are secured to the seat for enabling the connection of connecting means to which the end of the second belt is secured.

2 Claims, 6 Drawing Sheets

MOTOR VEHICLE SEAT FEATURING TWO SEAT BELTS

BACKGROUND OF THE INVENTION

The present invention relates to a motor vehicle seat featuring two seat belts, one of which fits automatically over the upper torso of the occupant when the latter sits on the seat and closes the door. For ensuring the safety of motor vehicle occupants, two seat belts, one each for shoulder and lap restraint, are sometimes employed. In certain countries, standards require that, when the vehicle door is opened, one of the belts be set automatically in a first position enabling the occupant to sit down on the seat, and that, when the door is closed, the same belt be set in a second position wherein the safety of the occupant is effectively ensured. The second belt, on the other hand, is fitted manually by the occupant.

Seat belts of the aforementioned type present a number of drawbacks.

Firstly, the position assumed by the shoulder belt over the upper torso is anatomically incorrect for effectively safeguarding the occupant. Also, in addition to either belt being fairly uncomfortable, connection of the belts to the vehicle bodywork involves a good deal of time and effort, on account of the limited access available for mounting the winding devices and other belt restraints as required on the bodywork.

SUMMARY OF THE INVENTION

The aim of the present invention is to provide a motor vehicle seat featuring two seat belts, and designed to overcome the aforementioned drawbacks.

With this aim in view, according to the present invention, there is provided a motor vehicle seat featuring two seat belts, each of which, when not in use, is wound partially on a respective winding device; characterised by the fact that it comprises:
- a first eyelet secured to the top of the seatback, on a first side of the same, and inside which a first of said belts slides;
- a first said winding device secured to the rear surface of said seat and on which said first belt is wound;
- a carriage moving substantially lengthwise in relation to the vehicle bodywork, between a first forward position and a second back-up position, and to which is secured one end of said first belt, said carriage being located on a second side of said seat opposite said first side;
- a second eyelet secured to the seat portion of said seat, on said first side, and inside which the second of said belts slides;
- a second said winding device secured underneath said seat and on which said second belt is wound;
- retaining means for one end of said second belt, said means being secured to said seat on said first side, and said end of said second belt having means for connection to said retaining means.

BRIEF DESCRIPTION OF THE DRAWINGS

A preferred embodiment of the present invention will be described by way of example with reference to the accompanying drawings, in which.

DETAILED DESCRIPTION OF THE INVENTION

The seat according to the present invention substantially comprises a seat portion 1; a seatback 2, the position of which may be adjusted in relation to seat portion 1 using any known type of device; a shoulder belt 3 designed to fit, as described later on, over the upper torso of the occupant; and a lap belt 4 designed to fit over the pelvic region.

Figure 1:
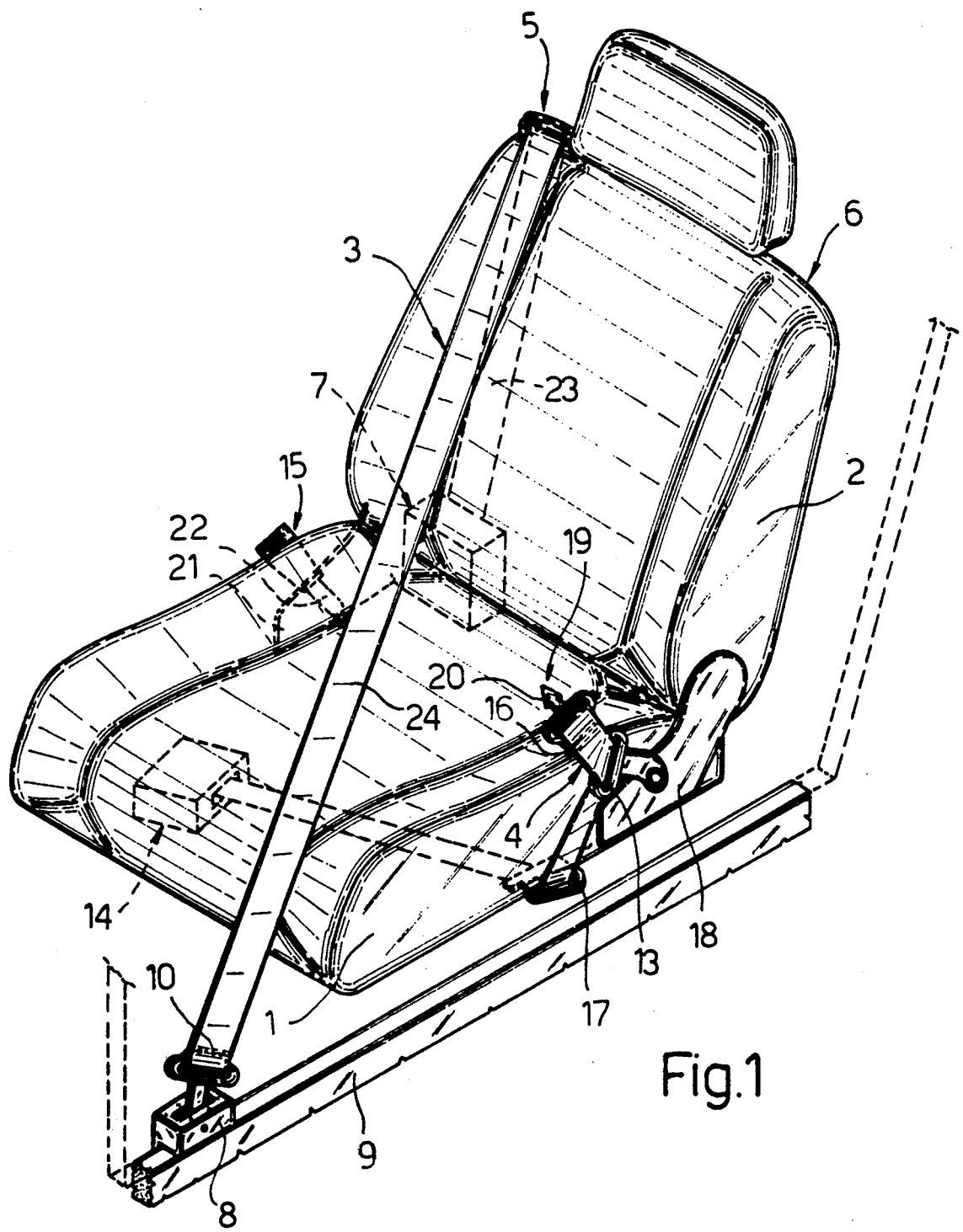
FIG. 1 shows a front view in perspective of a first configuration of the seat according to the present invention, when the vehicle door is opened.
Figure 6:
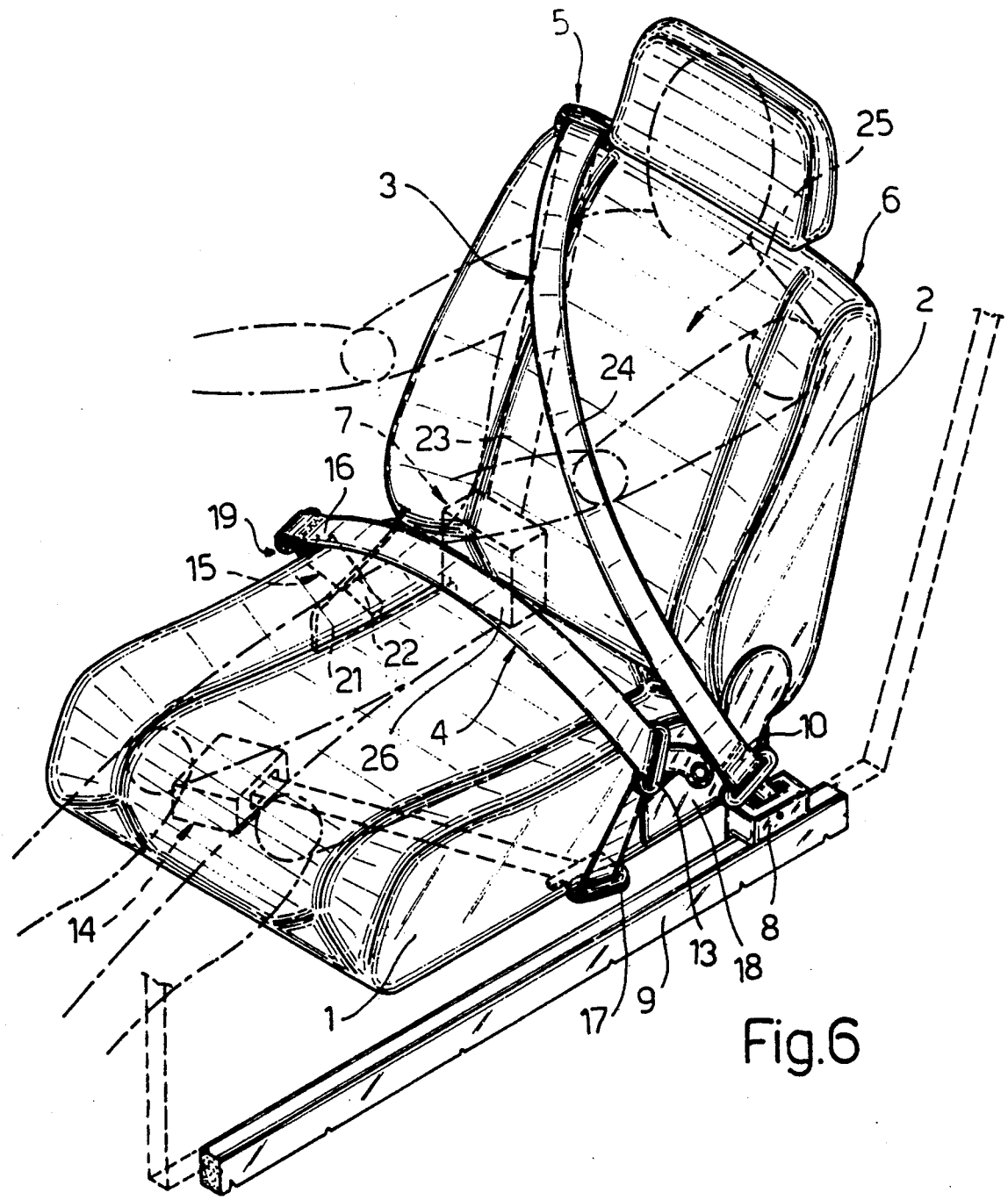
FIG. 6 shows a front view in perspective of the seat according to the present invention, with the seat belts in the working position.

Said seat also comprises an eyelet 5 secured to the top 6 of seatback 2, on one side of the same, and inside which said first belt 3 slides. A winding device 7 is secured to the rear surface of seat portion 1 for winding belt 3, the end 10 of which is secured to a carriage 8 designed to travel along outer bottom rail 9, and substantially lengthwise in relation to the vehicle bodywork, between a first forward position (FIG. 1) and a second back-up rearward position (FIG. 6). As shown clearly in FIGS. 1 and 6, said carriage 8 is located on the opposite side of the seat to that fitted with eyelet 5. Said seat also comprises a further eyelet 13 secured to seat portion 1, on the side of the seat facing said carriage 8, and inside which said second belt 4 slides. A second winding device 14 is secured underneath seat portion 1 for winding belt 4. On the opposite side of the seat to that fitted with eyelet 13, means 15 are provided for retaining end 16 of belt 4, which presents means 19 enabling connection to retaining means 15. Said seat also comprises a further eyelet 17 secured to and projecting from seat portion 1 in the direction of rail 9, and inside which belt 4 slides.

Figure 2:
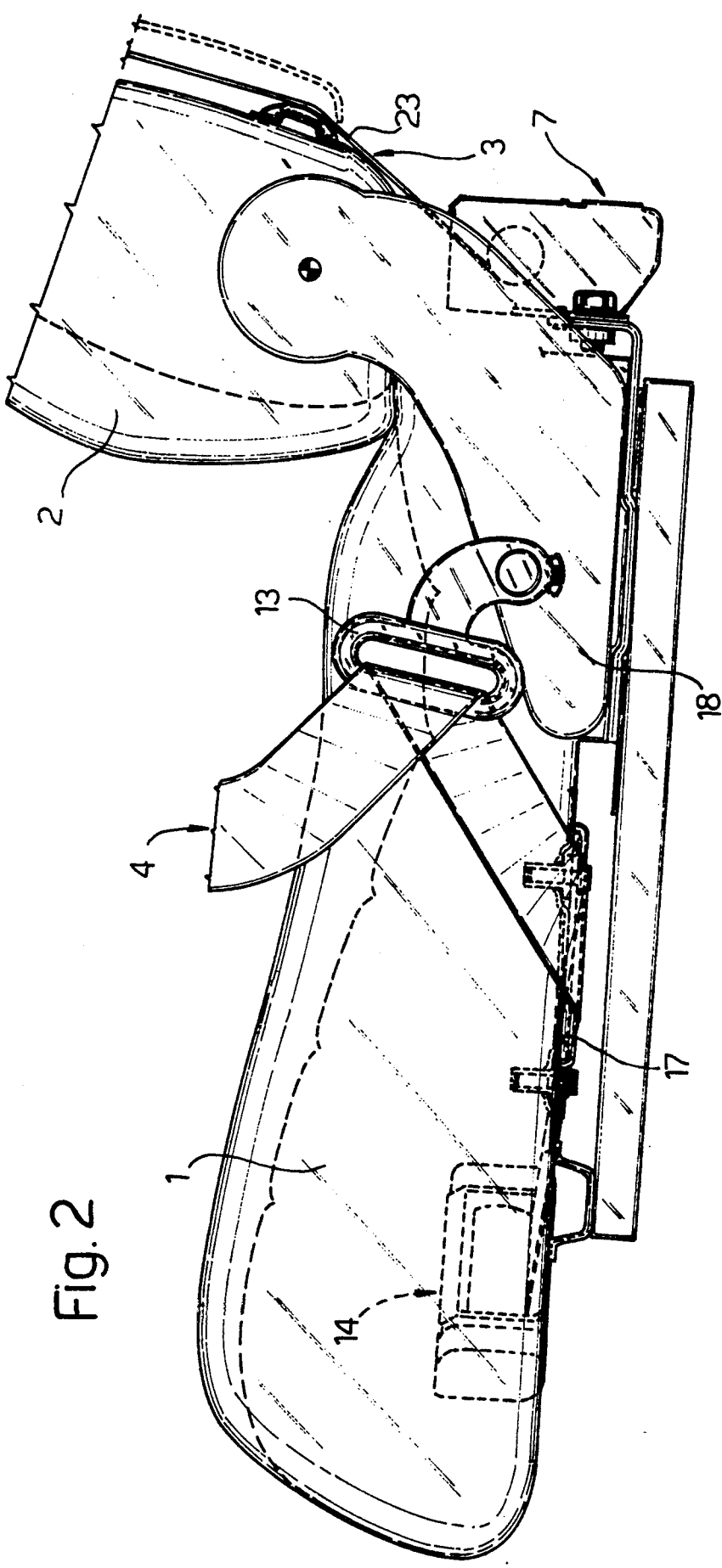
FIG. 2 shows a bottom side view of the seat according to the present invention.

As shown clearly in FIG. 2, eyelet 13 is secured to a plate 18 forming part of the seat supporting structure, and eyelet 17 to any part, e.g. a side member, of said structure.

Figure 3:
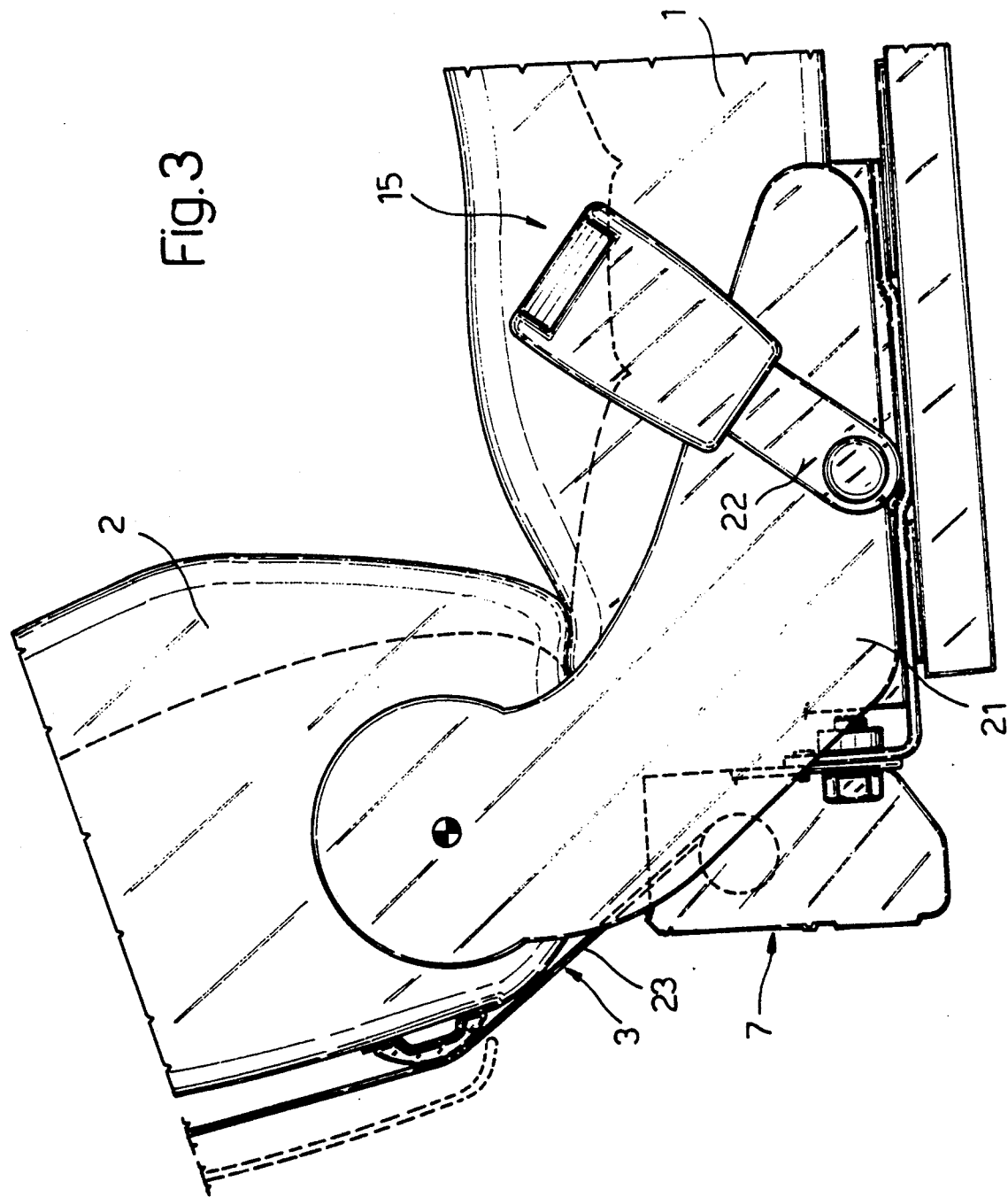
FIG. 3 shows a further partial side view of the seat according to the present invention.
Figure 4:
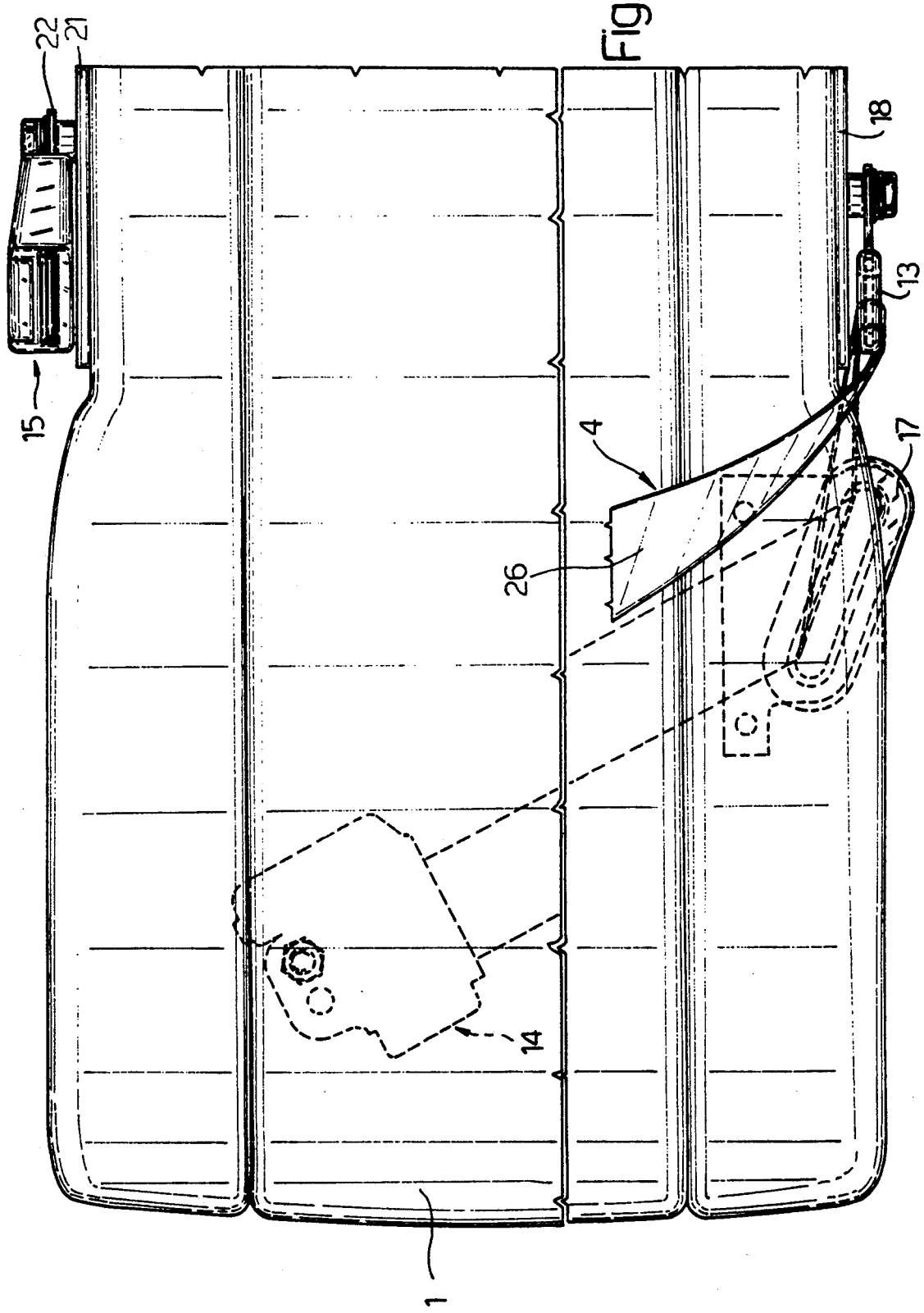
FIG. 4 shows a partial plan view of the seat according to the present invention.
Figure 5:
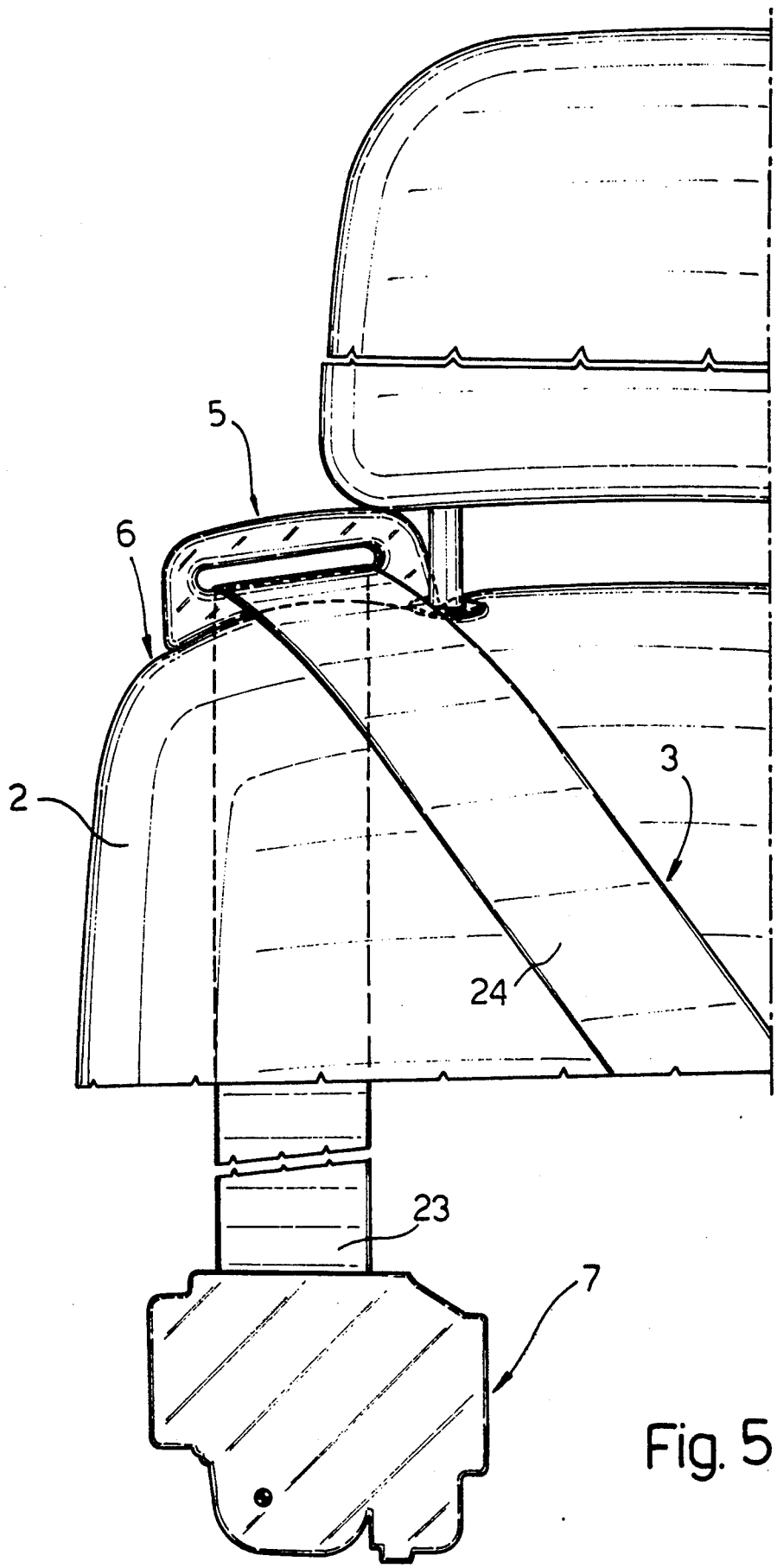
FIG. 5 shows a partial front view of the seatback on the seat according to the present invention.

Said retaining means 15 (FIG. 3) conveniently comprise a housing in which to insert and lock in known manner an appropriately shaped plate 20 (FIG. 1) integral with connecting means 19. Said housing is secured to a plate 21 on the seat supporting structure by means of a bracket 22.

The seat according to the present invention operates as follows. When the vehicle door is opened, carriage 8 is set automatically to the forward position (FIG. 1) by known means not shown, in which position, sufficient pull is exerted on end 10 of belt 3 to reel this off winding device 7 and so form two substantially straight belt sections 23 and 24, the first of which rests on the rear surface of seatback 2, and the second of which extends in a substantially straight line between eyelet 5 and carriage 8. The winding action of device 14, on the other hand, provides for partially retaining belt 4 inside the device, thus freeing the upper surface of seat portion 1 (FIG. 1) and enabling the occupant to slip beneath belt section 24 on to seat portion 1.

When the vehicle door is closed, carriage 8 is backed up moved rearwardly automatically into the FIG. 6 position, so as to bring belt section 24 substantially into contact with the upper torso of occupant 25, which section 24 (FIG. 6) fits over both the upper torso of the occupant and the shoulder on the innermost side of the seat. At the same time, the occupant grips end 16 of belt 4 (FIG. 1) and exerts sufficient pull on the same to reel it off winding device 14 and so produce belt section 26 (FIG. 6) which fits over the pelvic region. Finally, belt 4 is secured firmly in position by inserting plate 20 inside housing 19 of retaining means 15.

Both belts 3 and 4 therefore provide for effectively ensuring the safety of the occupant: belt 3 by preventing forward displacement of the upper torso, which function is rendered even more effective by virtue of belt section 24 resting on both the upper torso and the shoulder prior to engaging eyelet 5; and belt 4 by preventing displacement of the lower torso or pelvic region.

Both belts, and particularly belt 3, provide for maximum comfort by in no way impeding normal movement of the occupant when driving the vehicle.

Unlike known seat belts, which are fitted to the bodywork inside the passenger compartment, the seat belts on the seat according to the present invention may be fitted quickly and easily by virtue of being fitted directly on to the seat prior to assembly of the same to the vehicle bodywork.

Moreover, the seat may be designed to provide for maximum comfort, comparable to that of any other type of seat not fitted with seat belts.

To those skilled in the art it will be clear that changes may be made to both the design and arrangement of the component parts of the seat as described and illustrated herein without, however, departing from the scope of the present invention.

I claim:

1. A motor vehicle seat having an inner side and an outer side, said vehicle seat including a seat portion (1) securable to inner and outer side plates (18, 21) and having an underneath surface, and a seatback (2) adjustably mounted on said seat portion (1), said seatback (2) having a top portion (6) and a rear surface, said vehicle seat being mountable with said outer side adjacent a longitudinal bottom rail (9), said vehicle seat being fitted with a two seat belt system, comprising in combination:
    (a) a first eyelet (5) secured to said top portion (6) on said inner side;
    (b) a first winding device (7) carried by said seatback (2) secured to said rear surface on said inner side;
    (c) a shoulder belt (3) slidable through said first eyelet (5), said shoulder belt (3) having one end connected to said first winding device (7), and partially wound by said first winding device (7);
    (d) a carriage (8) securable to the other end (10) of said shoulder belt (3) and automatically movable lengthwise along said rail (9) between a forward position and a rearward position;
    (e) a second winding device (14) carried by said seat portion (1) secured to said underneath surface, a second eyelet (13) carried by the outer one (18) of said side plates (18, 21);
    (f) a third eyelet (17) secured to an outer edge of said underneath surface;
    (g) a lap belt (4) sliding through said second and third eyelets (13, 17), said lap belt (4) having one end connected to said second winding device (14), said lap belt (4) being partially wound by said second winding device (14), the other end (16) of said lap belt (4) being provided with a connecting and locking member (20); and
    (h) retaining means secured to the inner one (21) of said side plates (18, 21) and said retaining means including a housing for connecting and locking said member (20) when inserted therein.

2. A seat according to claim 1, wherein said second eyelet (13) is carried by a member pivotally mounted by on said outer side plate (18), and wherein said retaining means (15) is carried by another member (22) pivotally mounted on said inner side plate (21).

* * * * *

UNITED STATES PATENT AND TRADEMARK OFFICE
CERTIFICATE OF CORRECTION

PATENT NO. : 5,022,677
DATED : June 11, 1991
INVENTOR(S) : Roberto Barbiero

It is certified that error appears in the above-identified patent and that said Letters Patent is hereby corrected as shown below:

On title page item [73] Assignee:

the portion of the Assignee's name reading "Automobile E"

should read --Automobili E Corse--.

Signed and Sealed this

Ninth Day of March, 1993

Attest:

STEPHEN G. KUNIN

Attesting Officer    Acting Commissioner of Patents and Trademarks